(12) United States Patent
Kim et al.

(10) Patent No.: US 12,065,073 B2
(45) Date of Patent: Aug. 20, 2024

(54) LED LAMP FOR A VEHICLE AND A METHOD OF MANUFACTURING THE SAME USING MID AND MAGNETIC INDUCTION TECHNOLOGIES

(71) Applicants: HYUNDAI MOTOR COMPANY, Seoul (KR); KIA CORPORATION, Seoul (KR); BS TECHNICS CO., LTD., Ansan-si (KR); NIFCO KOREA INC., Anyang-si (KR); HYUNDAI MOBIS CO., LTD., Seoul (KR); ALPS ELECTRIC KOREA CO., LTD., Gwangju (KR)

(72) Inventors: Jun Sik Kim, Gwacheon-si (KR); Jung Sik Choi, Siheung-si (KR); Young Do Kim, Ansan-si (KR); Tae Kyoung Jung, Bucheon-si (KR); Seung-Sik Han, Hwaseong-si (KR); Hong-Sik Chang, Hwaseong-si (KR); Kwang-Pyo Cho, Gwangmyeong-si (KR); Young-Ju Lee, Suwon-si (KR); Jong-Hyun Park, Uiwang-si (KR); Jin-Won Lee, Suwon-si (KR); Jun-Geun Oh, Hwaseong-si (KR); Cheon-Ho Kim, Hwaseong-si (KR); Young-Jai Im, Hwaseong-si (KR); Sun-Mi Oh, Bucheon-si (KR); Kang-Sun Lee, Seongnam-si (KR); Sae-Ah Kim, Hwaseong-si (KR); Jong-Eun Park, Yongin-si (KR); Kwan-Woo Lee, Yongin-si (KR); Jong-Chae Lee, Anyang-si (KR); Jun-Hyun Park, Anyang-si (KR); Won-Il Lee, Gwangju (KR); Dae-Woo Park, Gwangju (KR)

(73) Assignees: HYUNDAI MOTOR COMPANY, Seoul (KR); KIA CORPORATION, Seoul (KR); BS TECHNICS CO., LTD., Ansan-si (KR); NIFCO KOREA INC., Asan-si (KR); HYUNDAI MOBIS CO., LTD., Seoul (KR); ALPS ELECTRIC KOREA CO., LTD., Gwangju (KR)

( * ) Notice: Subject to any disclaimer, the term of this patent is extended or adjusted under 35 U.S.C. 154(b) by 0 days.

(21) Appl. No.: 18/140,447

(22) Filed: Apr. 27, 2023

(65) Prior Publication Data
US 2023/0356652 A1  Nov. 9, 2023

(30) Foreign Application Priority Data
May 6, 2022  (KR) .................. 10-2022-0056078

(51) Int. Cl.
*H02J 50/10*  (2016.01)
*B60Q 1/26*  (2006.01)
(Continued)

(52) U.S. Cl.
CPC .......... *B60Q 1/2696* (2013.01); *F21V 19/002* (2013.01); *F21V 29/70* (2015.01); *H02J 50/10* (2016.02); *F21Y 2115/10* (2016.08)

(58) Field of Classification Search
CPC ... B60Q 1/2696; B60Q 1/0088; F21V 19/002; F21V 29/70; H02J 50/10; F21Y 2115/10;
(Continued)

(56) References Cited

U.S. PATENT DOCUMENTS

| | | | |
|---|---|---|---|
| 2010/0207534 A1* | 8/2010 | Dowling | ............ H05B 45/3725 313/46 |
| 2011/0127569 A1* | 6/2011 | Mineshita | ............ H01L 33/486 257/E33.066 |

(Continued)

FOREIGN PATENT DOCUMENTS

| | | | | |
|---|---|---|---|---|
| CN | 207316506 U | * | 5/2018 | |
| JP | 2017163015 A | * | 9/2017 | ............... B23K 1/00 |

(Continued)

OTHER PUBLICATIONS

English Translation of JP-2017163015-A, Sugiyama, Solder joint device, solder joint method (Year: 2017).*

*Primary Examiner* — Jong-Suk (James) Lee
*Assistant Examiner* — Glenn D Zimmerman
(74) *Attorney, Agent, or Firm* — Lempia Summerfield Katz LLC (57) ABSTRACT

A light-emitting diode (LED) lamp for a vehicle and a method of manufacturing the same use MID and magnetic induction technologies. The LED lamp includes a LED module, a housing accommodating the LED module, and a (Continued)

molded interconnect device (MID) electrode formed on a surface of the housing. The LED module may be mounted on the MID electrode by soldering using magnetic induction heating, the housing may be an injection molded product, and the MID electrode may be formed on the housing using a MID process.

13 Claims, 8 Drawing Sheets

(51) Int. Cl.
  *F21V 19/00* (2006.01)
  *F21V 29/70* (2015.01)
  *F21Y 115/10* (2016.01)

(58) Field of Classification Search
  CPC ........ F21S 41/143; F21S 41/192; F21S 43/14;
         F21S 43/195; F21S 41/141; F21S 41/19;
         B23K 1/002; B23K 1/0008; B23K
         26/362; B23K 26/702; B60Y 2410/124;
         F21K 9/235; F21K 9/237; F21K 9/238;
         F21K 9/90; F21W 2107/10

See application file for complete search history.

(56) References Cited

U.S. PATENT DOCUMENTS

| | | | |
|---|---|---|---|
| 2013/0044501 A1* | 2/2013 | Rudisill | F21V 29/70 362/398 |
| 2016/0076729 A1* | 3/2016 | Jin | B60Q 1/0041 362/509 |
| 2016/0219708 A1* | 7/2016 | Aiso | F21S 43/14 |
| 2017/0089547 A1* | 3/2017 | Ollila | F21V 17/101 |
| 2021/0320238 A1* | 10/2021 | Spirgi | F21S 43/15 |
| 2023/0258308 A1* | 8/2023 | Matsuoka | F21S 43/195 362/546 |

FOREIGN PATENT DOCUMENTS

| | | | | |
|---|---|---|---|---|
| JP | 2018144093 A | * | 9/2018 | ............. B23K 1/00 |
| KR | 1740589 B1 | * | 5/2017 | ............... F21K 9/68 |
| KR | 1748312 B1 | * | 6/2017 | ............... B60Q 3/53 |
| KR | 101748312 B1 | | 6/2017 | |
| KR | 20180111143 A | | 10/2018 | |
| WO | WO-2012117310 A1 | * | 9/2012 | ............. F21V 19/00 |
| WO | WO-2018125595 A1 | * | 7/2018 | ............... F21K 9/68 |
| WO | WO-2018182367 A1 | * | 10/2018 | ........... B60Q 1/2696 |

* cited by examiner

LED LAMP FOR A VEHICLE AND A METHOD OF MANUFACTURING THE SAME USING MID AND MAGNETIC INDUCTION TECHNOLOGIES

CROSS-REFERENCE TO RELATED APPLICATION

This application claims priority to Korean Patent Application No. 10-2022-0056078, filed on May 6, 2022, which is incorporated herein by reference in its entirety.

BACKGROUND OF THE DISCLOSURE

Technical Field

The present disclosure relates to a light-emitting diode (LED) lamp for a vehicle and a method of manufacturing the same, which applies a molded interconnect device (MID) and a magnetic induction technology. In particular, the MID is applied to an injection-molded product housing to form an MID circuit pattern.

Description of Related Art

A light-emitting diode (hereinafter, referred to as "LED") is a photoelectric device that has a junction structure of P-type and N-type semiconductors and emits light energy through a combination of electrons and holes when a voltage is applied thereto. Compared to general halogen lamps, LEDs consume less power, have excellent brightness, and have a long lifespan, and thus replace halogen lamps as light sources for various lighting devices. In addition, with the recent development of white LEDs, application fields of the white LEDs are rapidly expanding. Also, the white LEDs are widely used as light sources for vehicle lamps as well as indoor lighting lamps or portable lighting devices.

In general, lamps used in a vehicle are mainly used for a lighting function for showing or illuminating objects, signal and/or warning functions for informing other vehicles or pedestrians of a traveling state of the vehicle, a decorative function for decorating the vehicle, and the like. As the lamps for the lighting function, a ceiling lighting lamp inside a vehicle or a license plate lighting lamp outside the vehicle is representative.

The LED lamp mentioned above for a vehicle may be equipped with a lead wire to be electrically connected to an external lamp socket. The lead wire may be electrically connected to the LED through a substrate. Therefore, the conventional LED lamp has a problem in that manufacturing cost increases due to a large number of components forming a lamp module. Also, the manufacturing process for assembling respective components becomes complicated.

In addition, in the LED lamp, certain shapes for accommodating the lead wire, such as a wire through-hole and a wire seating groove, may be formed in a heat conduction cover. Therefore, the conventional LED lamp has an extremely limited degree of freedom in the design of the heat conduction cover forming a body of the lamp and has many restrictions in order to be applied to lamp sockets having various structures.

In order to solve these problems, it is known, such as is disclosed in Korean Patent No. 10-1748312 and Korean Patent Application Laid-Open No. 10-2018-0111143, to provide LED lamps, which may apply molded interconnect device (MID) technology to the conventional LED lamp to omit the configuration of the lead wire. The structure and the assembly process are thereby simplified to reduce the manufacturing cost and improve production efficiency.

However, the above documents disclose use of a reflow soldering method when the LED device, or a PCB on which the LED device or the like is formed, is mounted on a MID circuit pattern in order to manufacture the LED lamp. However, there is a problem in that, since the injection-molded product and the entire PCB pass through a heating furnace providing high-temperature heat, a very high heat-resistant material needs to be used for the reflow soldering method. Also, there is a problem in that, when a material having a low heat resistance is used, thermal damage occurs, and thus many defects in the injection-molded product or the PCB are found in the process of manufacturing the LED lamp.

SUMMARY OF THE DISCLOSURE

The present disclosure has been made in efforts to solve the problems of the related art. and the present disclosure is directed to providing a light-emitting diode (LED) lamp and a method of manufacturing the same. A molded interconnect device (MID) and a magnetic induction technology are applied, which may locally solder LED components through a magnetic induction method when the LED components are mounted on MID electrodes formed in an injection-molded product housing. The components are thereby stably mounted on an injection-molded product having low heat resistance.

An LED lamp for a vehicle uses MID and magnetic induction technologies according to the present disclosure. The LED lamp may include an LED module, a housing formed by injection molding and accommodating the LED module, and a MID electrode formed on a surface of the housing by an MID process. The LED module is mounted on the MID electrode by soldering using magnetic induction heating.

The LED lamp for a vehicle may further include a socket connecting unit formed by injection molding, connected to a lower portion of the housing, and connected to a lamp socket provided in a vehicle.

The MID electrode may include an LED electrode electrically connecting the LED module and a socket electrode, which is configured to electrically connect the LED electrode and the lamp socket.

The LED lamp for a vehicle may further include an MID heat-dissipation layer formed on the surface of the housing on which the LED module is seated by the MID process.

The MID heat-dissipation layer may be formed to be connected to the LED electrode in terms of a heat-dissipation effect.

A method of manufacturing an LED lamp for a vehicle uses MID and magnetic induction technologies. The method may include steps of: providing an upper housing formed by injection molding; performing a first etching on the upper housing by laser processing; forming an LED electrode by plating the first etching portion; dispensing a solder paste to the LED electrode; mounting an LED module on the solder paste; and melting the solder paste by induction heating. The LED electrode and the LED module may be directly implemented and mounted on the housing.

In addition, the method may further include etching a predetermined region on a surface of the housing of a portion on which the LED module is seated by laser processing and forming a MID heat-dissipation layer by plating the etching region.

In addition, a first connector may be connected to a touch sensor circuit, a second connector in contact with the first connector may be connected to an LED circuit, and a main connector may be connected to an end of one side of the LED circuit.

In addition, a shielding plate standing upright in a width direction of a lower housing may be formed on the lower housing on which the LED circuit is formed. A LED device may be installed on each of both left and right sides of the shielding plate.

In this case, a wiring plating that forms the touch sensor circuit and the LED circuit may include a first layer made of copper (Cu) and a second layer made of nickel (Ni).

A method of manufacturing a LED touch button module uses a MID and mold direct mounting (MDM). The method includes: providing an upper housing formed by injection molding; performing a first etching on the upper housing by laser processing; forming a touch sensor circuit wire on the first etching portion by plating; dispensing a solder paste to the touch sensor circuit wire; mounting a first connector on the solder paste; and melting the solder paste by induction heating. The touch sensor circuit and a first connector may be directly implemented and mounted on the upper housing.

In addition, the method may further include: providing a lower housing formed by injection molding; performing a second etching on the lower housing by the laser processing; forming a LED circuit wire on the second etching portion by the plating; dispensing the solder paste to the LED circuit wire; mounting the LED device and a second connector to the solder paste; and melting the solder paste by the induction heating. The LED circuit, the LED device, and the second connector may be directly implemented and mounted on the lower housing.

In addition, the method may further include dispensing the solder paste to each portion in which a terminal connection is required between the touch sensor circuit of the upper housing and the LED circuit of the lower housing, mounting a connecting terminal to the upper and lower solder paste. The method may also include arranging an induction heating unit at an outside of the upper housing and the lower housing on which the connecting terminal may be mounted and melting the upper and lower solder pastes by the induction heating. The connecting terminal between the touch sensor circuit and the LED circuit may be directly mounted by the induction heating.

The MID heat-dissipation layer may be formed to be connected to the LED electrode.

The LED lamp for a vehicle and the method of manufacturing the same using the MID and magnetic induction technologies according to the present disclosure configured as described above have the following advantages.

First, the LED lamp according to the present disclosure can apply the magnetic induction heating method at room temperature to mount the LED component on the MID circuit directly formed on the injection-molded product. The general injection-molded product material having low heat resistance is thereby applied.

Second, since the LED lamp according to the present disclosure can apply the MID technology to the plastic material, it is possible to freely design the integrated three-dimensional shape one step beyond the method of designing the two-dimensional LED lamp to bond or assemble the designed LED lamp, thereby highlighting high-end images.

Third, since the LED lamp according to the present disclosure can be integrally designed, it is possible to reduce the number of components. Doing so eliminates many conventional processes of manually soldering and assembling the LED lamp, and reduces the defect rate due to the simplification of the process, thereby maximizing the effect of the unit cost reduction.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not intended to limit the present disclosure.

DESCRIPTION OF SPECIFIC EMBODIMENTS

In a light-emitting diode (LED) lamp according to the present disclosure, a circuit pattern (hereinafter, referred to as an "electrode") for electrical connection is directly formed on a housing, which is formed as an injection-molded product using a molded interconnect device (MID) technology. Also, an LED device, or a printed circuit board (PCB, or hereinafter, referred to as a "substrate") on which the LED device, is formed may be soldered using magnetic induction local heating and then finished with a lamp cover.

Since the present disclosure may have various modifications and various embodiments, specific embodiments are shown in the drawings and described in detail in the detailed description. However, it should be understood that this is not intended to limit the present disclosure to the specific embodiments and includes all modifications, equivalents, and substitutes included in the spirit and scope of the present disclosure. In describing the embodiments of the present disclosure, where it has been determined that a detailed description of related known technologies may obscure the gist of the present disclosure, a detailed description thereof has been omitted. When a component, device, element, or the like, of the present disclosure, is described as having a purpose or performing an operation, function, or the like, the component, device, or element should be considered herein as being "configured to" meet that purpose or to perform that operation or function.

Hereinafter, an LED lamp manufactured by applying MID and magnetic induction technologies according to one embodiment of the present disclosure is described in detail with reference to the accompanying drawings.

Figure 1:
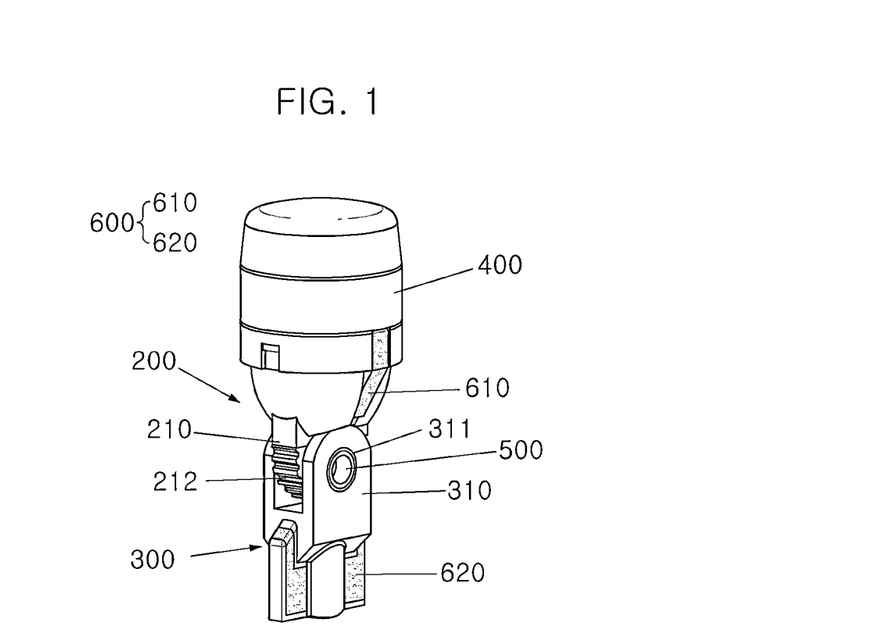
FIG. 1 is a view showing an exterior of a light-emitting diode (LED) lamp for a vehicle according to one embodiment of the present disclosure.
Figure 2:
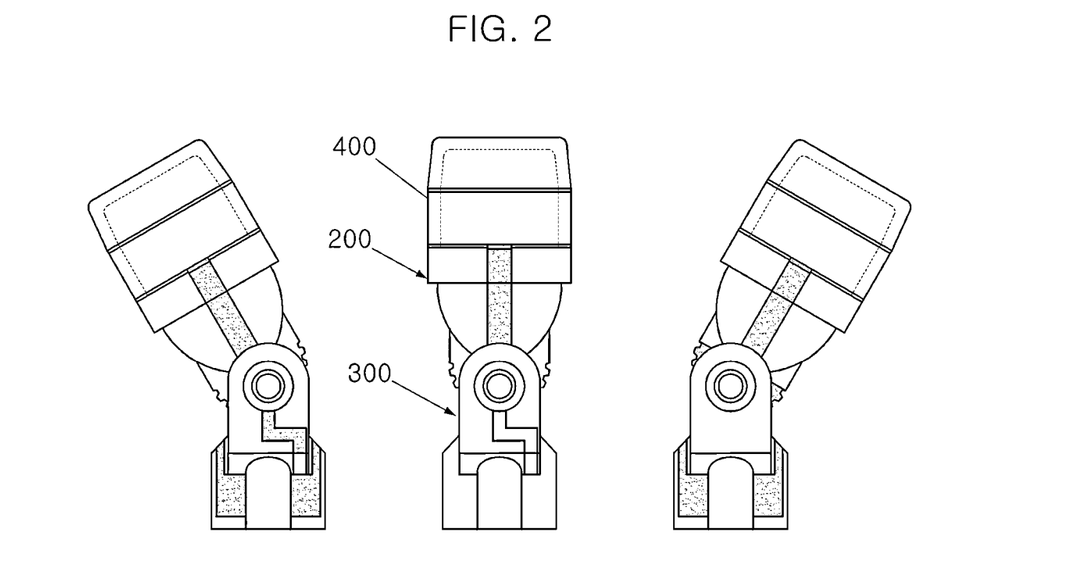
FIG. 2 is a view showing an angle adjustment state of the LED lamp for a vehicle according to one embodiment of the present disclosure.
Figure 3:
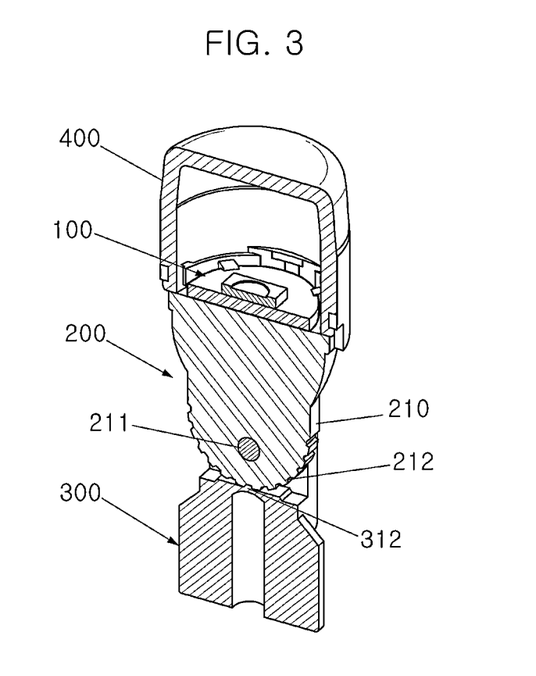
FIG. 3 is a cross-sectional view of the LED lamp for a vehicle according to one embodiment of the present disclosure.

FIG. 1 is a view showing an exterior of an LED lamp for a vehicle according to one embodiment of the present disclosure. FIG. 2 is a view showing an angle adjustment state of the LED lamp for a vehicle according to one embodiment of the present disclosure. FIG. 3 is a cross-sectional view of the LED lamp for a vehicle according to one embodiment of the present disclosure.

As shown in FIGS. 1-3, the LED lamp for a vehicle according to the present disclosure includes a housing 200 forming a lamp body, an LED module 100 mounted in the housing 200, a socket connecting unit 300 connected to a lamp socket (not shown) provided in a vehicle, and a lamp cover 400 for covering the LED module 100 accommodated in the housing 200.

Figure 4:
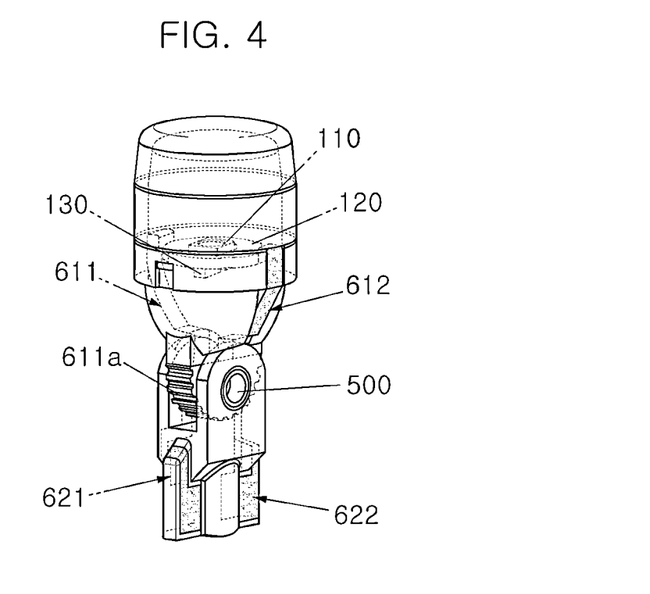
FIG. 4 is a view showing a wiring structure of a molded interconnect device (MID) electrode by transparently showing a housing and a socket connecting unit forming the exterior of the LED lamp for a vehicle according to one embodiment of the present disclosure.

Referring to FIG. 4, the LED module 100 may be formed as a module in which a plurality of LED devices 110 may be mounted on a substrate 120 as a light source of the LED lamp. The LED device 110 may be formed of a plurality of LED devices for emitting light of different colors. A circuit pattern may be printed on the substrate 120 and a control device 130 for controlling driving of the LED device 110, and the like, together with the LED device 110, may be mounted on the circuit pattern.

The housing 200 forms the lamp body and has the LED module 100 accommodated in an upper portion thereof. A first hinge plate 210 is connected to the socket connecting unit 300 in an angle-adjustable manner provided on a lower portion thereof. A MID electrode 600 as described below is formed on a surface of the housing 200.

The housing 200 may be an injection-molded product manufactured by plastic injection molding. In particular, in the present disclosure, by applying a magnetic induction heating method at room temperature to mount the LED module 100 on the MID electrode 600 directly formed on the housing 200, which is injection molded, it is possible to apply a general injection-molded product material having low heat resistance. In other words, the material of the injection-molded product is not limited and may be, for example, a polycarbonate (PC) material, a polyphenylene sulfide (PPS) material, or a laser direct structuring (LDS) resin material. A detailed description of a method of mounting the LED module 100 on the MID electrode 600 by the magnetic induction heating is described below.

A lower portion of the socket connecting unit 300 may be connected to the lamp socket (not shown) provided in a vehicle. A second hinge plate 310 connected to the housing 200 may be provided on an upper portion thereof. The MID electrode 600, which is described below, may also be formed on a surface of the socket connecting unit 300. The socket connecting unit 300 may also be formed by injection molding with plastic. A material of the injection-molded product may be not limited and may be the same material as a material of the housing 200.

In the LED lamp according to one embodiment of the present disclosure, the housing 200 accommodating the LED module 100 may be tiltably coupled to the socket connecting unit 300 so that the LED module 100 may selectively irradiate light in various directions. In other words, the housing 200 may be hinge-coupled to the socket connecting unit 300.

To this end, the first hinge plate 210 in which a hinge hole 211 is formed may be provided at a lower end of the housing 200. A pair of second hinge plates 310 disposed at both sides of the first hinge plate 210, each having a hinge hole 311, may be provided at an upper end of the socket connecting unit 300. The first and second hinge plates 210 and 310 may be coupled through a hinge shaft 500 passing through the hinge holes 211 and 311 respectively formed therein. In this case, the hinge shaft 500 forms a tilting central axis of the housing 200.

As shown in FIG. 2, an angle of the housing 200 for each tilting step may be variously adjusted to provide convenience in use.

To this end, a gear unit 212 may be formed on an outer circumferential surface of the housing 200 and a latching protrusion 312 that latches between teeth forming the gear unit 212 may be formed on one surface of the socket connecting unit 300. Therefore, the angle of the housing 200 may be maintained until an external force that is greater than or equal to a predetermined level is applied thereto in a tilting direction of the housing 200 in a state of being adjusted at a predetermined angle.

Referring to FIGS. 3 and 4, the gear unit 212 may be formed on the first hinge plate 210 forming the lower portion of the housing 200. In other words, the first hinge plate 210 may have a semicircular shape and the gear unit 212 may have a plurality of teeth formed on an outer circumferential surface thereof. In other words, the first hinge plate 210 itself may have a semicircular gear shape.

In addition, the latching protrusion 312 restricts the rotation of the first hinge plate 210 by latching between the teeth of the gear unit 212 and may be formed to protrude upward from a contact surface of the socket connecting unit 300 in contact with the gear unit 212. Specifically, the latching protrusion 312 may be formed to protrude a predetermined length from the center of an upper surface of the socket connecting unit 300 formed between the second hinge plates 310 of the socket connecting unit 300.

As shown in FIG. 2, while the housing 200 tilts in a left-right direction, the gear unit 212 of the first hinge plate 210 is latched by the latching protrusion 312 (see FIG. 3) of the socket connecting unit 300. The housing 200 may be adjusted to a predetermined angle. Therefore, LED light irradiated into a vehicle may be adjusted and fixed at various angles.

In addition, in the present disclosure, since the first hinge plate 210, itself forming the lower portion of the housing 200, has a semicircular gear shape, it is possible to finely adjust the angle in a broad angular range.

In the LED lamp according to the present disclosure, electrodes for electrical connection to the LED module may be directly formed on the surfaces of the housing and the socket connecting unit formed by injection molding using the MID technology.

Figure 5:
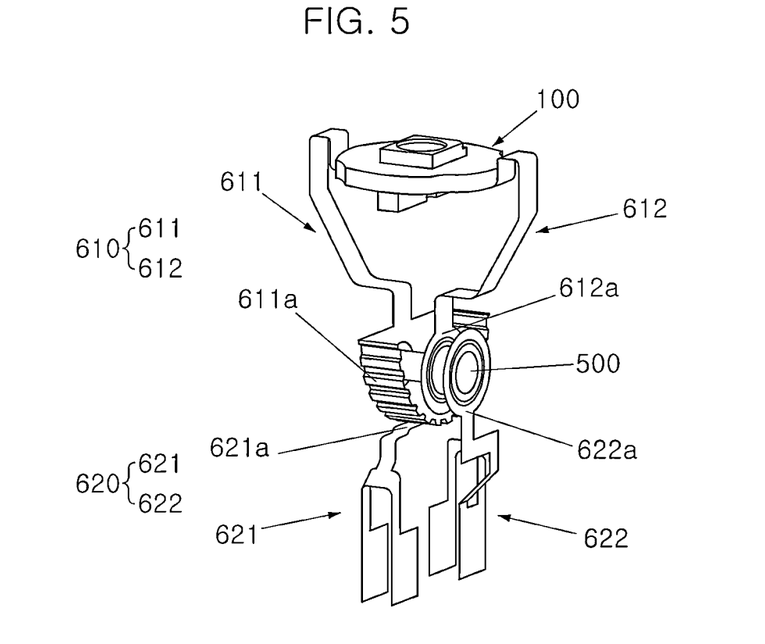
FIG. 5 is a view showing that an LED module is mounted on the MID electrode according to one embodiment of the present disclosure.

FIG. 4 is a view showing a wiring structure of the MID electrode 600 by transparently showing the housing 200 and the socket connecting unit 300 forming the exterior of the LED lamp for a vehicle according to one embodiment of the present disclosure. FIG. 5 is a view showing that the LED module is mounted on the MID electrode formed on the surface of the LED lamp for a vehicle according to one embodiment of the present disclosure.

As shown in FIGS. 1-5, the electrodes for electrical connection to the LED lamp may be the MID electrode 600 directly formed as a circuit pattern on the surfaces of the housing 200 and the socket connecting unit 300 formed by injection molding. The MID electrode 600 may be etched to a predetermined region of an outer surface of the injection-molded product by laser processing and directly formed in the form of the circuit pattern by plating the etched region with metal.

The MID electrode 600 includes an LED electrode 610 formed on the outer surface of the housing 200 and a socket electrode 620 formed on the outer surface of the socket connecting unit 300. In this case, the LED electrode 610 may be an electrode electrically connecting the LED module 100 and the socket electrode 620. The socket electrode 620 may be an electrode electrically connecting the LED electrode 610 and the lamp socket (not shown) installed in a vehicle. In other words, the MID electrode 600 has a structure in which the LED electrode 610 and the socket electrode 620 may be electrically connected and serve as lead electrodes for supplying power to the LED module 100 through the surface of the housing 200 or the surfaces of the housing 200 and the socket connecting unit 300.

In the present disclosure, even when the housing 200 tilts to the socket connecting unit 300 and the angle thereof is adjusted, continuous connection may be made without electrical connection and/or disconnection through the MID electrode 600.

Referring to FIGS. 4 and 5, the LED electrode 610 includes a pair of first and second LED electrodes 611 and 612 connected to both sides of the LED module. The first LED electrode 611 linearly extends from a seating surface of one side of the LED module 100 in a longitudinal direction of the housing 200. The first LED electrode 611 has a gear unit wiring 611a wired in the shape of the gear unit 212 forming the first hinge plate 210. The second LED electrode 612 linearly extends from a seating surface of the other side of the LED module 100 in the longitudinal direction of the housing 200. The second LED electrode 612 has a hinge hole wiring 612a extending to the first hinge hole 211 formed in the first hinge plate 210.

The socket electrode 620 includes a pair of first and second socket electrodes 621 and 622 formed on both side surfaces in which the socket connecting unit 300 may be inserted into the lamp socket (not shown). The first socket electrode 621 linearly extends from an end of the socket connecting unit 300 in a longitudinal direction of the socket connecting unit 300. The first socket electrode 621 has a latching protrusion wiring 621a wired to a portion in which the latching protrusion 312 (see FIG. 3) is formed along the upper surface of the socket connecting unit 300. The second socket electrode 622 linearly extends from the end of the socket connecting unit 300 in the longitudinal direction of the socket connecting unit 300. The second socket electrode 622 has a hinge hole wiring 622a extending to a second hinge hole 311 formed in the second hinge plate 210.

As described above, the first LED electrode 611 and the first socket electrode 621 formed at any one side (left side in FIG. 5) of the LED lamp may be plated to the entire shapes of the gear unit 212 and the latching protrusion 312. The second LED electrode 612 and the second socket electrode 622 formed on the other side (right side in FIG. 5) may be plated to the hinge holes 211 and 311 of each hinge plate 210 and 310. As described above, since the first LED electrode 611 and the first socket electrode 621 may be formed to include the entire portion in which the housing 200 is tiltably connected to the socket connecting unit 300, the LED electrode 610 and the socket electrode 620 may be electrically connected continuously in the entire range of the tilting angle of the housing 200.

The LED module 100 may be mounted on the surface of the injection-molded housing 200 on which the MID electrode 600 may be wired through soldering. In the LED lamp according to the present disclosure, the LED module 100 may be soldered on the MID electrode 600 using magnetic induction local heating.

Figure 6:
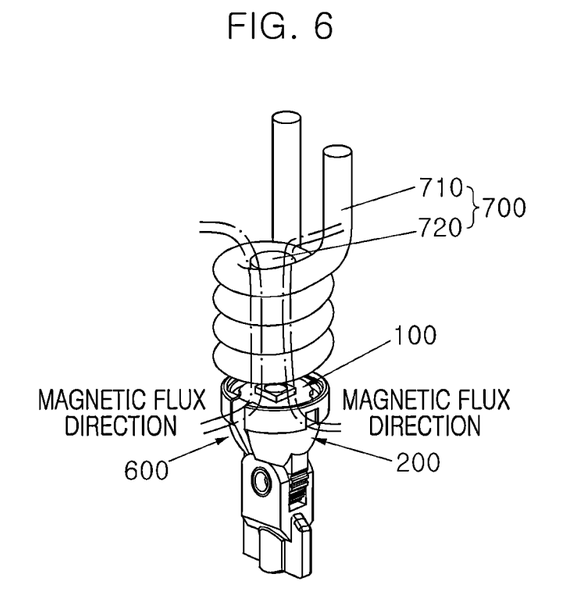
FIG. 6 is a view showing that the LED module is mounted (mold direct mounting (MDM)) by induction heating soldering in the LED lamp for a vehicle according to one embodiment of the present disclosure.

As shown in FIG. 6, in the LED lamp, soldering may be performed after arranging an induction heating unit 700 just above the LED module 100 in a state in which the LED module 100 is mounted on the MID electrode 600 directly formed on the injection-molded housing 200. In this case, the induction heating unit 700 performs the induction heating on the MID electrode 600. Therefore, as a solder paste applied between the MID electrode 600 and the LED module 100 melts, the LED module 100 may be directly mounted (mold direct mounting (MDM)) on the housing 200 formed by injection molding.

Here, the induction heating unit 700 includes an induction heating coil 710 electrically connected to a high-frequency power supply unit (not shown) and includes a magnetic core 720 disposed in the induction heating coil 710 to concentrate a magnetic flux induced by the induction heating coil 710 to a soldering portion. In this case, although the induction heating unit is not shown, it is possible to consecutively solder the LED modules mounted on a plurality of LED lamp housings while moving the plurality of LED lamp housings in X-axis/Y-axis/Z-axis directions through a transfer robot (not shown). In addition, the transfer robot (not shown) may include a plurality of induction heating units to simultaneously solder the plurality of LED lamps at once.

As described above, in the present disclosure, the electrode for electrical connection may be directly formed on the injection-molded product housing using the MID technology in the LED lamp. The LED module may be directly mounted on the MID electrode formed on the injection-molded product using the magnetic induction local heating. Therefore, compared to the conventional reflow soldering method, there is an advantage capable of being used without limitation to the material of the injection-molded housing forming the body of the LED lamp. In other words, instead of using an expensive high heat resistance material (heat deflection temperature (HDT), 260° C. or higher) as the material of the housing, a relatively inexpensive injection-molded product material having low heat resistance. For example, a PC material, a PPS material, or an LDS resin material may be used.

Figure 7:
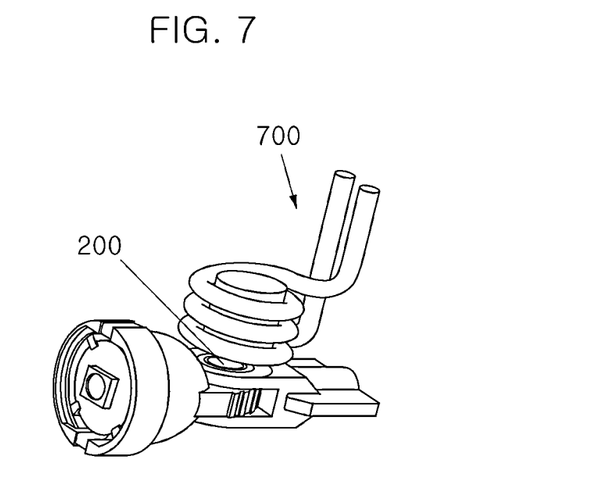
FIGS. 7 and 8 are views showing the exterior and interior of the LED lamp for a vehicle according to one embodiment of the present disclosure in which a housing and a connecting unit of a connector are fixed by induction heating soldering.
Figure 8:
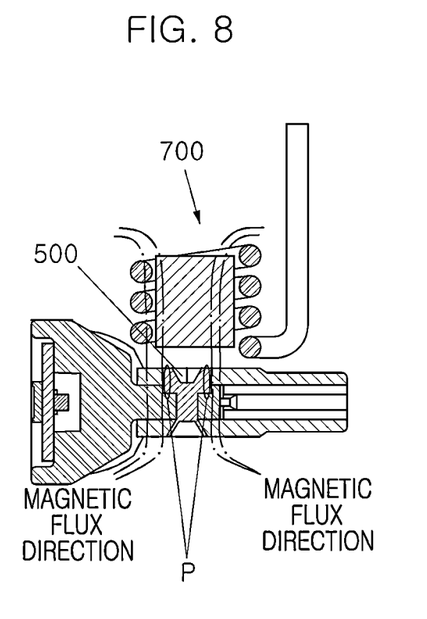

As shown in FIGS. 7 and 8, the hinge shaft 500 connecting the housing 200 and the socket connecting unit 300 may be fixed by induction heating soldering. In other words, a solder paste P may be applied between the hinge shaft 500 and the hinge hole wiring 612a (see FIG. 5) of the second LED electrode or the hinge hole wiring 622a (see FIG. 5) of the second socket electrode and then soldered by the induction heating unit 700 to firmly fix the hinge shaft 500 to the hinge holes 211 and 311.

Figure 9:
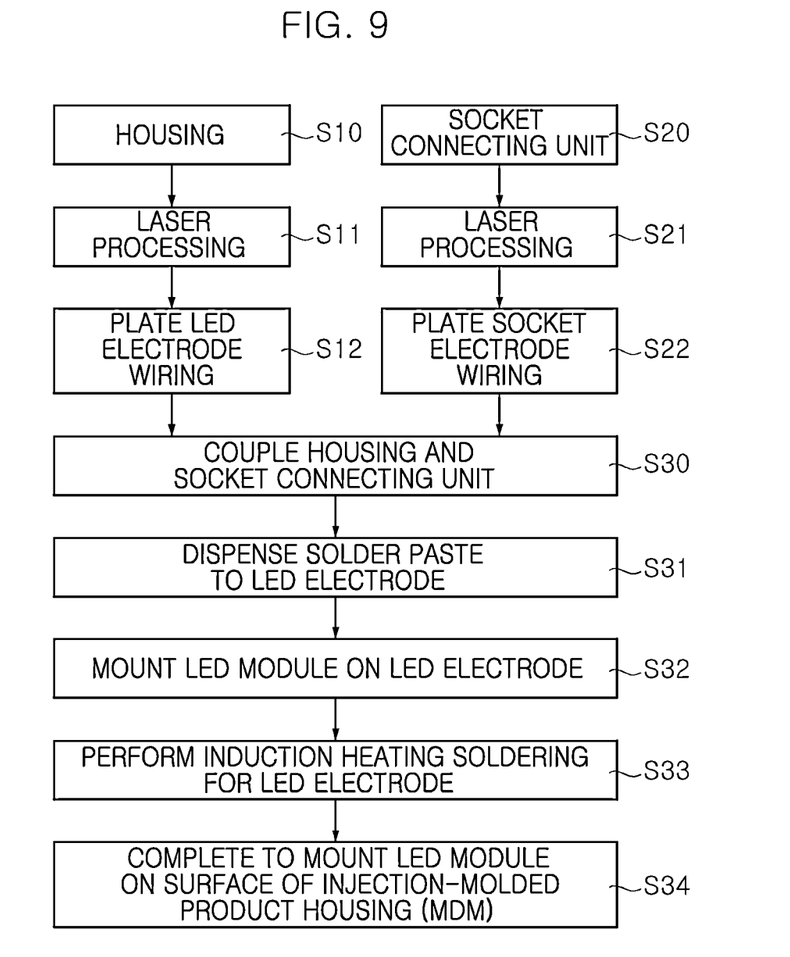
FIG. 9 is a view showing a manufacturing method by an MID process and an MDM process in the LED lamp for a vehicle according to one embodiment of the present disclosure.

Hereinafter, a manufacturing method in which the LED lamp according to one embodiment of the present disclosure is mounted on the injection-molded housing is described with reference to FIG. 9.

First, the housing formed by injection molding may be provided (S10). The surface of the housing may be etched by laser processing according to the position at which the LED electrode is formed (S11). In this case, the laser processing creates a fine uneven pattern groove through a laser direct structuring (LDS) method, a laser manufacturing antenna (LMA) method, or a coated laser manufacturing conductor (CLMC) method. Then, a plating layer may be formed by plating an etching region with metal (S12). In this case, the wiring plating may include a first layer made of copper (Cu) and a second layer made of nickel (Ni). Therefore, the LED electrode as the MID electrode may be directly formed on the surface of the injection-molded product forming the LED lamp housing (S12).

Next, the socket connecting unit 300 formed by injection molding may be provided (S20). The surface of the socket connecting unit 300 may be etched according to the position at which the socket electrode is formed by the laser processing identically to the above-described MID process (S21). Then, a plating layer may be formed by plating metal in an etching region (S22). In this case, the wiring plating may include a first layer made of copper (Cu) and a second layer made of nickel (Ni). Therefore, the socket electrode as the MID electrode may be directly formed on the surface of the injection-molded product of the socket connecting unit forming the LED lamp (S22).

Then, the housing 200 on which the LED electrode is wired and the socket connecting unit 300 on which the socket electrode is wired may be coupled (S30) together. The LED module may be soldered on the LED electrode by the induction heating method and directly mounted on the injection-molded housing. To this end, the solder paste may be dispensed to the LED electrode (S31). In addition, the LED module may be mounted on the solder paste (S32). Then, by arranging the induction heating unit just above the LED module to perform the induction heating on the LED electrode (S33), as the solder paste melts, the LED module may be directly mounted on the LED electrode wired to the surface of the injection-molded housing (S34).

In addition, in the process of manufacturing the LED lamp, the solder paste may be applied to the hinge shaft connecting the housing and the socket connecting unit and then soldered by the induction heating unit to firmly fix the hinge shaft (see FIGS. 7 and 8).

Figure 10:
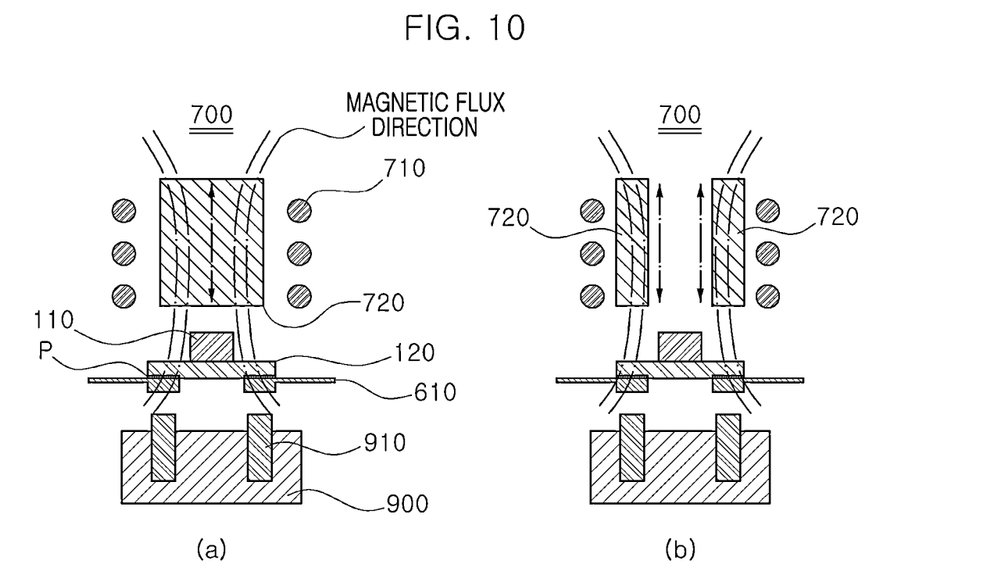
FIGS. 10 and 11 are views showing the MID electrode and a magnetic induction coil and a magnetic core for concentrating a magnetic flux of the soldering of the LED module according to various embodiments of the present disclosure.
Figure 11:
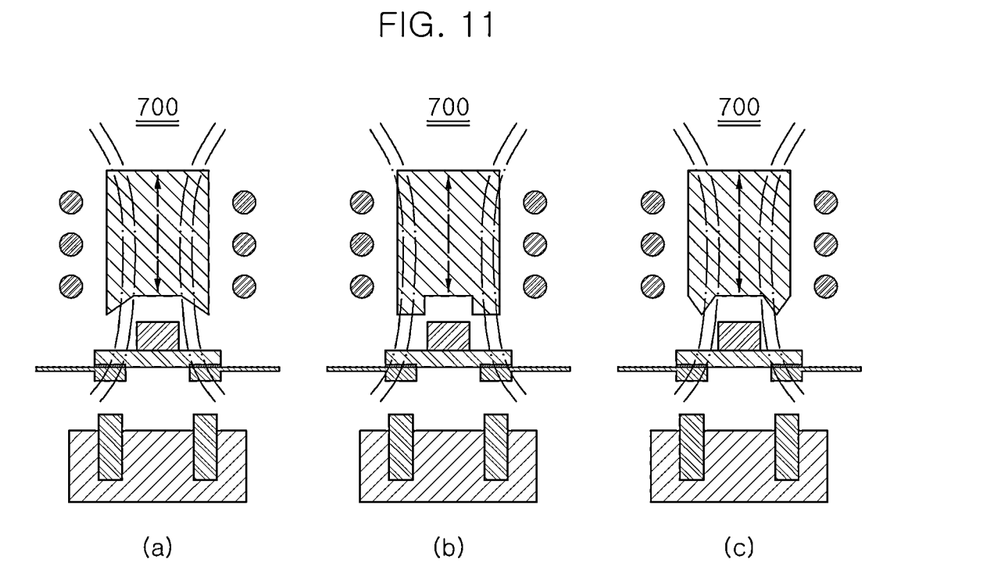

FIGS. 10 and 11 are views showing the MID electrode and a magnetic induction coil and a magnetic core for concentrating a magnetic flux of the soldering of the LED module according to various embodiments of the present disclosure.

Referring to FIG. 10, the induction heating unit 700 includes the induction heating coil 710 in the form of a coil and one magnetic core 720 disposed inside the induction heating coil 710 to concentrate the magnetic flux induced by the induction heating coil 710 to the soldering portion (see FIG. 10A). In addition, two magnetic cores 720 having a relatively smaller diameter may also be respectively disposed at both sides of the soldering portion inside the induction heating coil 710 to concentrate the magnetic flux to both sides of the soldering portion (see FIG. 10B).

In addition, a jig 900 for fixing the LED lamp may be disposed under the induction heating coil 710. In this case, a coupling portion of the jig 900 may be formed to correspond to the shape of the LED lamp. A material thereof may be a non-conductive material, such as a plastic material or a non-ferrous metal material.

In the jig 900, a lower magnetic body 910 may be installed at a point of the jig 900 facing the magnetic core 720 disposed at the induction heating coil 710 side. An accurate point at which the lower magnetic body 910 is installed may be a point just under the portion in which the soldering is performed, i.e., the portion of the LED electrode 610 to which the solder paste P is applied. Therefore, since the magnetic core 720 and the lower magnetic body 910 face each other in a vertical direction and magnetic induction is concentrated on the soldering region between the facing points, it is possible to greatly increase the soldering efficiency of the LED electrode.

In addition, as shown in FIG. 11, even when one magnetic core 720 is used, a front edge portion of the magnetic core 720, i.e., both ends of the magnetic core 720 just above the portion in which the soldering is performed may further extend downward to concentrate the magnetic flux to the soldering portion. In this case, the soldering may be locally performed by sharpening the portion extending downward from the magnetic core 720 to the end thereof.

Figure 12:
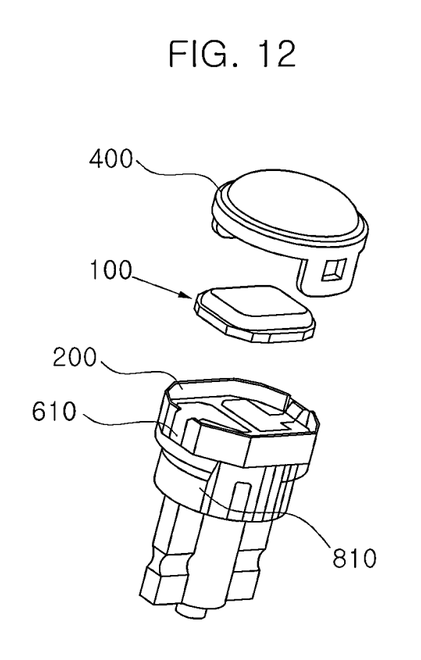
FIG. 12 is an exploded view showing an exterior of an LED lamp for a vehicle according to another embodiment of the present disclosure.

FIG. 12 is a view showing an LED lamp according to another embodiment of the present disclosure. A difference between the LED lamp in the embodiment and the LED lamp shown in FIG. 1 is that a heat-dissipation device to which the MID technology is applied may be provided. In other words, the heat-dissipation device may be formed by MID heat-dissipation layer 810 formed by plating the surface of the housing 200 formed of the injection-molded product with metal. The MID heat-dissipation layer 810 may be formed by etching a predetermined region on the surface of the housing 200 by the laser processing and plating the etched region with metal.

The MID heat-dissipation layer 800 may be formed on the entire outer circumferential surface of the housing 200 of the portion on which the LED module 100 is seated. In this case, the MID heat-dissipation layer 800 may be formed to be continuously connected to the LED electrode 610. Therefore, heat generated from the LED module 100 may be transmitted to the MID heat-dissipation layer 800 through the LED electrode 610, thereby efficiently dissipating heat to the outside of the lamp.

As described above, the LED lamp according to the present disclosure has the MID heat-dissipation layer 800 directly formed on the surface of the housing. Therefore, unlike the conventional LED lamps, since the present disclosure does not require a separate metal component, such as a heat sink used as a heat-dissipation device, it is possible to flexibly respond to the miniaturization of the LED lamp for a vehicle and reduce the number of components. The assembling process and the manufacturing cost are thereby reduced.

In addition, the LED lamp in the embodiment of FIG. 12 may be different from the LED lamp shown in FIG. 1 in that, when the LED module 100 is formed, the LED module 100 may be a chip on board (COB) LED module in which various devices, such as the LED device and the LED control device, may be packaged into one and mounted on the substrate rather than the LED module in which these devices may be mounted on the substrate.

Although each embodiment of the present disclosure has been described above with reference to the drawings, those having ordinary skill in the art should be able to understand that the embodiments of the present disclosure may be variously modified and changed without departing from the spirit and scope of the present disclosure described in the appended claims.

What is claimed is:

1. A light-emitting diode (LED) lamp for a vehicle using molded interconnect device (MID) and magnetic induction technologies, the LED lamp comprising:
   a LED module;
   a housing accommodating the LED module;
   a socket connecting unit connected to a lower portion of the housing and connected to a lamp socket provided in the vehicle;
   a MID electrode including a LED electrode formed on a surface of the housing and a socket electrode formed on a surface of the socket connecting unit; and
   a MID heat-dissipation layer formed on the surface of the housing on which the LED module is seated,
   wherein the LED module is mounted on the MID electrode,
   wherein the MID heat-dissipation layer is connected to the LED electrode and is configured to dissipate heat generated from the LED module through the LED electrode to an outside of the LED lamp,
   wherein the LED electrode includes a pair of first and second LED electrodes connected to both sides of the LED module, and
   wherein the MID electrode includes a wiring structure in which the first LED electrode has a gear unit wiring wired in a shape of a gear unit and the second LED electrode has a hinge hole wiring extending to a hinge hole.

2. The LED lamp of claim 1, wherein the MID electrode includes a LED electrode electrically connecting the LED module and a socket electrode, which is configured to electrically connect the LED electrode and the lamp socket.

3. The LED lamp of claim 1, wherein the MID heat-dissipation layer is formed on the entire outer circumferential surface of the housing on which the LED module is seated.

4. The LED lamp of claim 3, wherein the MID heat-dissipation layer is formed to be continuously connected to the LED electrode.

5. A light-emitting diode (LED) lamp for a vehicle using molded interconnect device (MID) and magnetic induction technologies, the LED lamp comprising:
   a LED module;
   a housing formed by injection molding and accommodating the LED module;
   a MID electrode formed on a surface of the housing by a MID process and including an LED electrode electrically connecting the LED module and a socket electrode; and
   a MID heat-dissipation layer formed on the surface of the housing on which the LED module is seated by the MID process,
   wherein the LED module is mounted on the MID electrode by soldering using magnetic induction heating,
   wherein the MID heat-dissipation layer is connected to the LED electrode and is configured to dissipate heat generated from the LED module through the LED electrode to an outside of the LED lamp,
   wherein the LED electrode includes a pair of first and second LED electrodes connected to both sides of the LED module, and
   wherein the MID electrode includes a wiring structure in which the first LED electrode has a gear unit wiring wired in a shape of a gear unit and the second LED electrode has a hinge hole wiring extending to a hinge hole.

6. The LED lamp of claim 5, further comprising a socket connecting unit formed by injection molding, connected to a lower portion of the housing, and connected to a lamp socket provided in the vehicle.

7. The LED lamp of claim 6, wherein the socket electrode is configured to electrically connect the LED electrode and the lamp socket.

8. The LED lamp of claim 7, wherein the MID heat-dissipation layer is formed on the entire outer circumferential surface of the housing on which the LED module is seated and is formed to be continuously connected to the LED electrode.

9. A method of manufacturing a light-emitting diode (LED) lamp for a vehicle using molded interconnect device (MID) and magnetic induction technologies, comprising steps of:
   providing an upper housing formed by injection molding;
   performing a first etching on the upper housing by laser processing;
   forming a LED electrode by plating the first etching portion;
   dispensing a solder paste to the LED electrode;
   mounting a LED module on the solder paste; and
   melting the solder paste by induction heating,
   wherein the LED electrode and the LED module are directly implemented and mounted on the housing,
   wherein a MID heat-dissipation layer is formed to be connected to the LED electrode and is configured to dissipate heat generated from the LED module through the LED electrode to an outside of the LED lamp,
   wherein the LED electrode includes a pair of first and second LED electrodes connected to both sides of the LED module, and
   wherein the MID electrode includes a wiring structure in which the first LED electrode has a gear unit wiring wired in a shape of a gear unit and the second LED electrode has a hinge hole wiring extending to a hinge hole.

10. The method of claim 9, further comprising:
    etching, by laser processing, a predetermined region on a surface of the housing of a portion on which the LED module is seated and forming the MID heat-dissipation layer by plating the etching region.

11. The method of claim 10, wherein the MID heat-dissipation layer is formed on the entire outer circumferential surface of the housing on which the LED module is seated and is formed to be continuously connected to the LED electrode.

12. The method of claim 11, wherein an induction heating unit is configured to perform an induction heating and includes an induction heating coil disposed above a LED lamp and a magnetic core disposed inside the induction heating coil.

13. The method of claim 12, wherein the induction heating unit further includes a jig on which the LED lamp is mounted and a lower magnetic body disposed at a position facing the magnetic core to concentrate a magnetic flux to a soldering portion.

* * * * *